Dec. 10, 1929. H. S. JANDUS 1,739,236
RESILIENT CLAMP
Filed Feb. 28, 1927   2 Sheets-Sheet 1
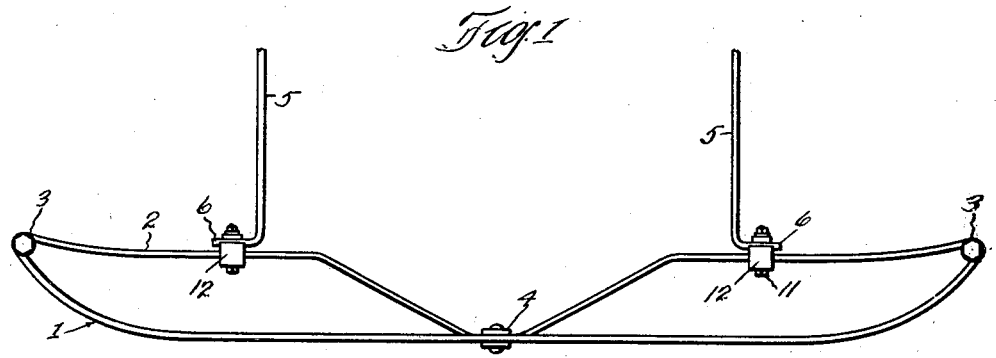
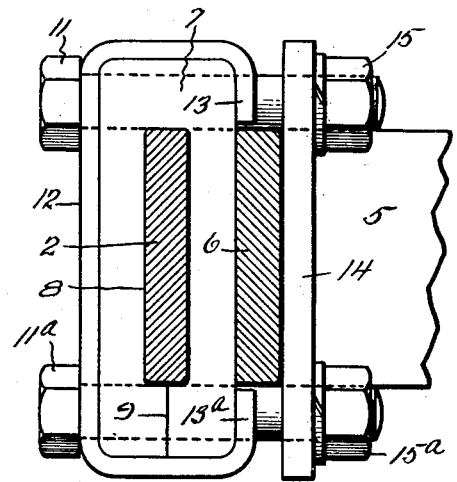
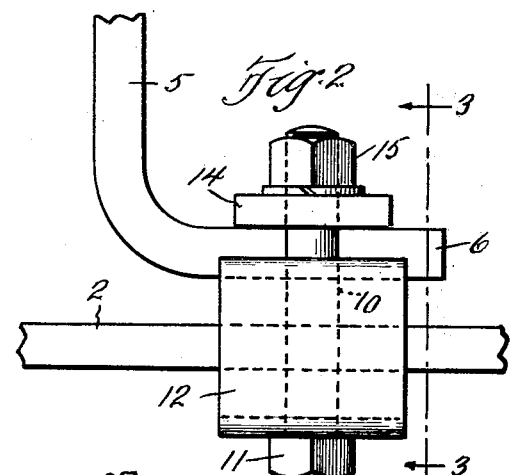
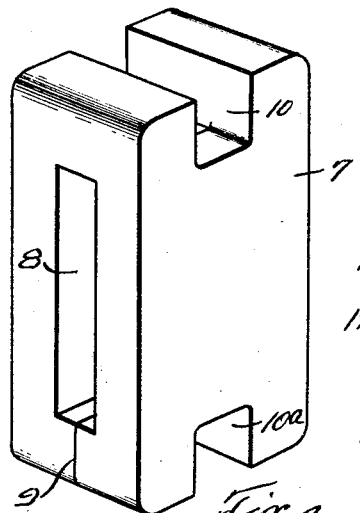
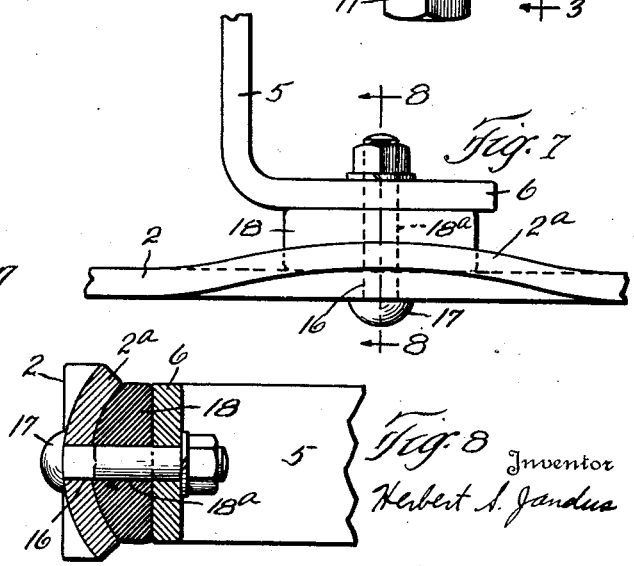
Inventor
Herbert S. Jandus
By Hull, Brock and West
Attorney

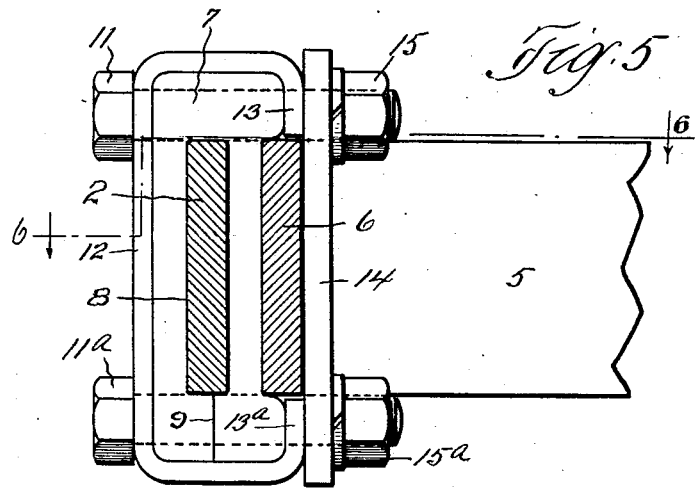
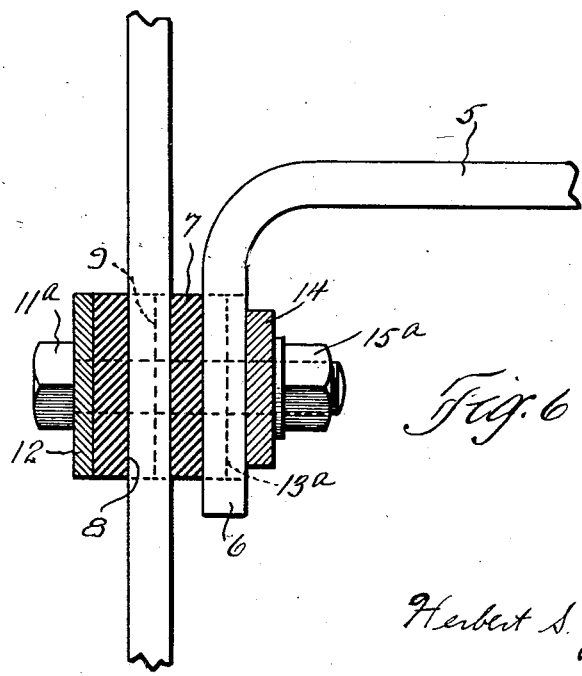

Patented Dec. 10, 1929

1,739,236

UNITED STATES PATENT OFFICE

HERBERT S. JANDUS, OF DETROIT, MICHIGAN, ASSIGNOR, BY MESNE ASSIGNMENTS, TO GENERAL SPRING BUMPER CORPORATION, A CORPORATION OF MICHIGAN

RESILIENT CLAMP

Application filed February 28, 1927. Serial No. 171,471.

This invention relates to a clamp for attaching an automobile bumper to the arms designed to support the bumper from the automobile and has for its general object to provide a flexible connection which will be resilient at the point of connection. A further advantage of my invention is that it provides a simple and effective type of pivotal connection which may be cheaply constructed and which will prevent rattling of the clamped parts.

Further advantages will be apparent from the following description and drawings and from the use of the combination of elements herein claimed.

In the drawings Fig. 1 is a plan view of the bumper with the clamp attachment; Fig. 2 is a detail plan view of the clamp attachment; Fig. 3 is a sectional view of the clamp attachment taken on the lines 3—3 of Fig. 2; Fig. 4 is a perspective detail view of the rubber block which forms a part of the clamp attachment; Fig. 5 is a sectional view similar to that shown in Fig. 3 taken when the clamp is under compression; Fig. 6 is a sectional view taken on the line 6—6 of Fig. 5; Fig. 7 is a detail plan view of a modified form of clamp attachment; Fig. 8 is a sectional view taken on the line 8—8 of Fig. 7.

In the description and claims I have assumed the bumper to be attached to the front of a vehicle and reference is made to the several parts in view of this assumption but it is not intended to so limit the application of the bumper to any particular portion of the vehicle.

Describing the various parts by reference characters 1 represents an automobile bumper bar. The bumper may be of the type shown in the McGregor Patent No. 1,372,154 issued March 22, 1921, said bumper comprising a pair of vertically spaced impact bars connected at their ends by pivotal connections 3 to a rear bar 2 which has its central portion projected forwardly and connected to the impact bars by means of a suitable clamp 4. So far as my invention is concerned, the particular type of bumper with which it is employed is immaterial except in so far as the bumper affords means by which it may be conveniently connected to the support arms 5 by the use of such invention.

Each of the arms 5 is connected at its rear end to an automobile (not shown) and is bent outwardly at its forward end as shown at 6.

Fig. 4 shows a block 7, of rubber or other suitable yielding material, which has a portion cut out at 8 of sufficient size to enclose the bar 2. This block is split at one end as shown at 9, to allow it to be slipped over the bar 2, and has notches 10 and 10ª cut out at the top and bottom for the reception of the stems of the bolts 11 and 11ª.

The plate or strap 12 is bent so as to partly surround the rubber block 7, its ends 13 and 13ª terminating at such a distance apart as to allow room between them for the end portion 6 of the arm 5. The plate or strap 12 has two holes in its continuous side and notches in its ends 13 and 13ª for the reception of the stems of the bolts 11 and 11ª. 14 denotes a plate adapted to bear upon the back of the arm 6 and having holes at each end to receive the stems of the bolts 11 and 11ª.

In assembling the clamp the rubber block 7 is separated at 9, slipped over the bar 2 and the plate 12 is placed around the block. The bolts 11 and 11ª are then passed through the holes in the plate 12, the notches in the block 7, the notches in the ends 13 and 13ª of the plate 12, and the holes in the plate 14. The ends 6 of the support arms 5 are then inserted between the plate 14 and the rubber block 7 and the nuts 15 and 15ª are tightened to hold the bars in the desired relative position.

Figs. 5 and 6 show the clamp in its fully closed position, with the plate 14 bearing on the ends 13 and 13ª of plate 12 and the rubber block under compression. The clamp thus provides a resilient connection between the bumper bar and the support arm, and at the same time it allows some pivotal movement between them but prevents objectionable rattling by interposing a cushioning surface between the two pieces of spring steel.

Figs. 7 and 8 show a modified form of attachment which is cheaper to construct. The rear bar 2 has a hole 16 through which the bolt 17 passes and in order to strengthen the bar at this point the edges of the bar are bent inwardly or rearwardly, as shown at 2ª. 18 represents a block of rubber or other material which may be shaped at one side to conform to the inner surface of the curved portion 2ª of the bar 2, and which has a hole 18ª for the passage of the bolt 17. In assembling this form of attachment, the bolt 17 is passed through the hole 16 in the curved portion 2ª, through the hole 18ª in the rubber block 18 and the hole in the end portion of the arm 6. It is preferred that the hole 16 be made slightly larger than the stem of the bolt 17 in order to allow some pivotal movement on the bolt. By tightening the nut on the bolt 17 the end 6 of the support arm 5 is resiliently held in the proper spaced relation to the bar 2.

It is apparent that my resilient connections might be substituted for the usual types of connections at other points throughout the bumper where two bars are to be fastened together, such for instance as at the clamp 4 or at the ends 3 of the impact bars, and it is not intended to confine the use of this clamp to the particular application shown. It is also apparent that the clamp might be used with other types of bumpers than that shown.

By the use of this resilient means of connection a bumper which is resilient throughout may be connected to the automobile frame without any intermediate rigid point. A blow struck directly upon the clamp would be resisted by a yielding of the resilient material and the blow would be cushioned because of the construction of the clamp.

It is further apparent that the yielding of the block 7 will allow a pivotal action between the support arms and the bumper bar and it will thereby assist in allowing all parts of the bumper to cooperate in absorbing the shock and in preventing a permanent distortion of the support arms and the bars of the bumper. By compressing the yielding block 7 to such an extent that it will hold the bars from movement relative to each other, the pivotal movement between the bars will be completely taken up by the resilient block which will avoid the frictional wearing which takes place in a pivotal mounting where the metallic parts are in contact. The strap 12 surrounding the block 7 will prevent lateral expansion of that block and so increase the force resisting contact of the bars 2 and 6. In the modification shown in Figs. 7 and 8, the curved portion 2ª of the bar 2 will restrict the lateral expansion of the block 18.

The block 7 has been described as made of rubber but it is apparent that other suitable yielding materials could be used in place of the rubber.

Having thus described my invention, what I claim is:

1. The combination of a bumper having a bar adapted to support the impact element, a support arm for supporting said bar from a vehicle, and means for resiliently connecting the support arm to the said bar, said means consisting of a block of yielding material surrounding the bar, a plate adapted to press upon the outside of the arm and means for compressing the yielding material between the bar and arm.

2. A resilient clamp for connecting a bumper bar to a support arm consisting of a block of rubber adapted to surround the bumper bar and being cut at one side for the passage of the bar, a plate adapted to bear on the outside of the support arm, a strap bent around said block and leaving room between its ends for the support arm, and means for drawing the plate and strap toward each other.

3. A resilient clamp for connecting bumper bars together consisting of a yielding pad adapted to fit between the bars and means for compressing the bars against the yielding pad and means for restricting lateral expansion of said pad.

4. A resilient clamp for connecting bumper bars consisting of a block of yielding material adapted to surround one of the bumper bars, a plate adapted to bear upon the outside of the other bar and means for compressing the yielding material between the two bars.

5. The combination of two bumper bars adapted to be connected together, a piece of compressible material adapted to surround one of the bars and to extend between the bars, and means for drawing the bars toward each other.

6. In an automobile bumper the combination of two bars adapted to be held in spaced relation to each other, a block of resilient material having a hole therein for the reception of one of the bars and having notches therein for the reception of bolts, a C shaped strap, adapted to partly surround the resilient material, having its ends spaced apart for the reception of the second bar and having apertures in its end portions for the reception of the aforementioned bolts, and a plate adapted to bear upon the exposed surface of the second bar and upon the end portions of the strap and bolts for drawing the said strap and said plate toward each other.

7. The combination with a resilient automobile bumper, of means for resiliently connecting said bumper to a support arm, said means consisting of a block of compressible material adapted to enclose a portion of a bar of the bumper, a strap adapted to enclose a portion of said block, a plate adapted to bear upon the rear surface of the support arm and means for drawing said strap toward said plate.

8. The combination with a resilient automobile bumper, of means for resiliently connecting said bumper to a support arm, said means consisting of a block of compressible material adapted to enclose a portion of a bar of the bumper, a strap adapted to enclose a portion of said block, a plate adapted to bear upon the rear surface of the support arm and means for drawing said strap toward said plate, said last mentioned means including bolts passing through apertures in the end portions of the plate and through apertures in the end portions of the strap.

9. In a resilient bumper, means for connecting two bars together, said means including a rubber block surrounding one of the bars and held under compression between the bars by a suitable clamp.

10. The combination with two bars of a resilient bumper, of a piece of compressed rubber surrounding one of the bars and means for regulating the compression of the rubber.

11. In a vehicle bumper the combination of two bars held in spaced relation to each other, a piece of compressed resilient material surrounding one of said bars, a strap bearing upon the compressed resilient material and having its ends bent around said material and spaced so as to receive the second bar therebetween, a plate bearing upon the outside of the second bar, and means holding the strap and plate so as to keep the resilient material under compression.

12. In a vehicle bumper means for resiliently connecting two of the bumper bars together, said means consisting of a piece of resiliently yielding material under compression between said bars, a strap adapted to partly surround and to bear upon said compressed material and having its ends spaced so as to accommodate a bar between said ends, a plate bearing upon the outside of the bar and upon the end portions of the strap, and means preventing the separation of the said strap and the said plate.

13. A resilient bumper including a spring steel impact element, a spring steel arm for attaching said impact element to a vehicle, and resilient clamping means for connecting the support arm to the impact element, said means consisting of a piece of compressible resilient material adapted to extend between the arm and a bar of the impact element, means for preventing lateral expansion of said material and a clamping device for drawing the said arm and bar toward each other.

14. A resilient bumper including a spring steel impact element, a spring steel arm for attaching said impact element to a vehicle, and resilient clamping means for connecting the support arm to the impact element, said means consisting of a block of compressible resilient material adapted to enclose a portion of a bar of the impact element, a strap adapted to bear upon and enclose a portion of the said block, a plate adapted to bear upon the said arm and means for drawing the strap and the plate toward each other.

15. The combination, with a vehicle bumper, of a support arm connected thereto and extending toward the vehicle, means for resiliently and pivotally connecting said support arm to said vehicle bumper, said means comprising a block of rubber compressed between said support arm and bumper, and means for holding said rubber under compression.

16. A resilient connection between the bars of a bumper, said connection comprising a piece of compressible material between said bars, a piece of compressible material outside of one of said bars, a plate adapted to bear upon the outer compressible material, and a second plate adapted to cooperate with said first mentioned plate to draw said bars together.

In testimony whereof, I hereunto affix my signature.

HERBERT S. JANDUS.